Figure 1:
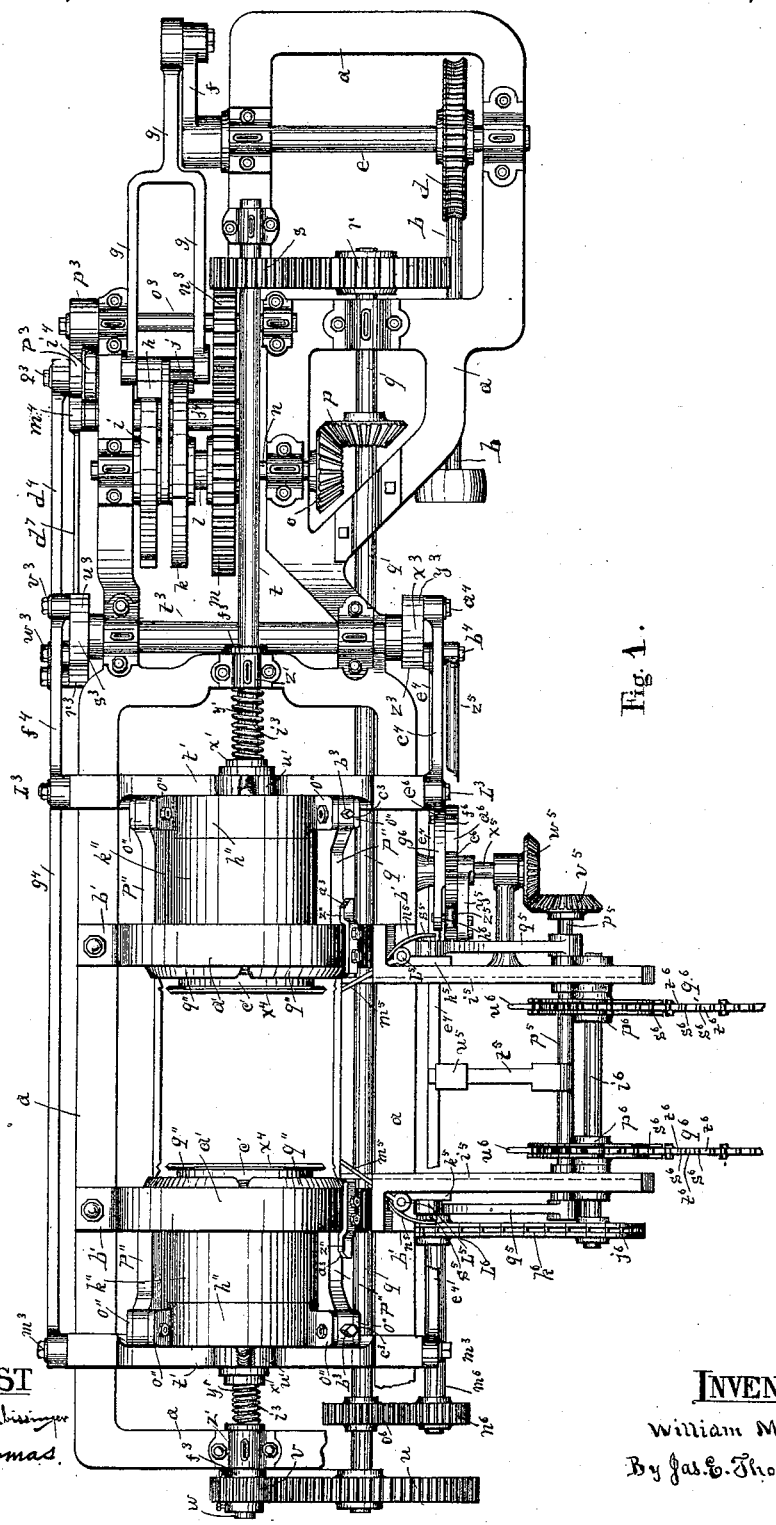

(No Model.) 11 Sheets—Sheet 1.

W. MERRILL.
BARREL MACHINE

No. 454,915. Patented June 30, 1891.

ATTEST
Fred Becklisinger
G. P. Thomas

INVENTOR
William Merrill
By Jas. E. Thomas Atty.

(No Model.) 11 Sheets—Sheet 2.

W. MERRILL.
BARREL MACHINE.

No. 454,915. Patented June 30, 1891.

ATTEST.
Fred Becklissinger
G. P. Thomas

INVENTOR.
William Merrill
By Jas. E. Thomas
Atty

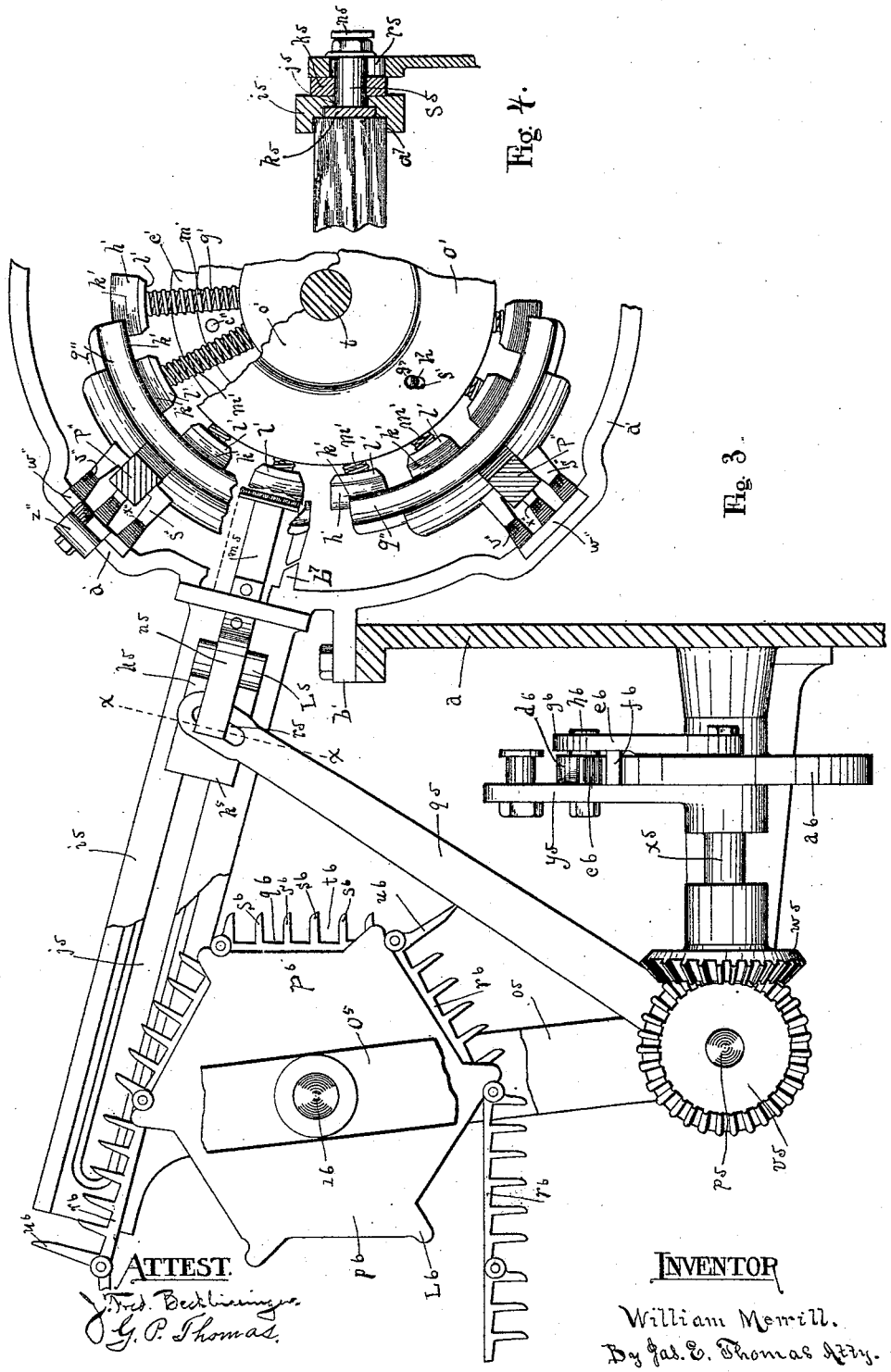

(No Model.) 11 Sheets—Sheet 4.
W. MERRILL.
BARREL MACHINE.
No. 454,915. Patented June 30, 1891.
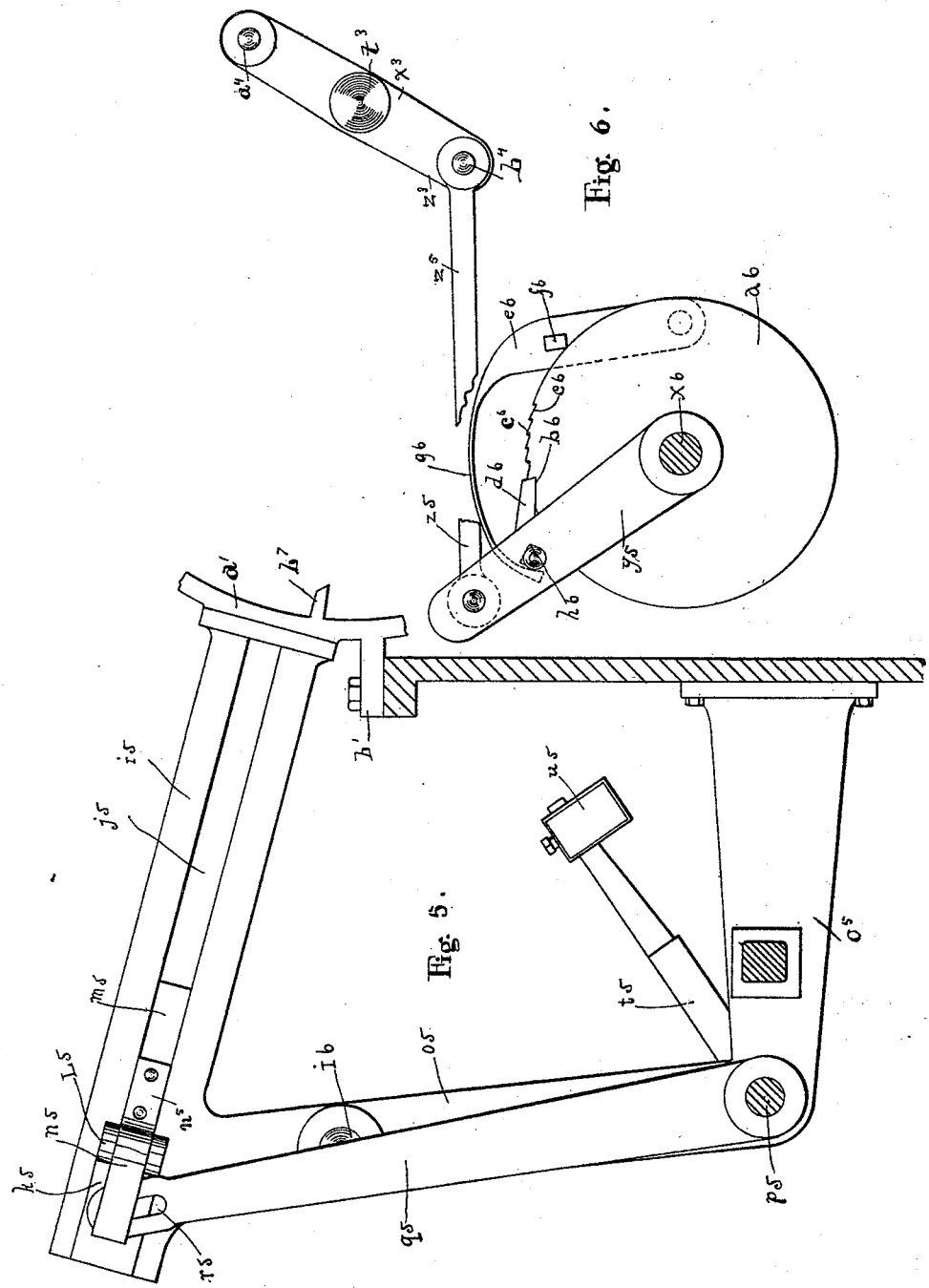
ATTEST.
J. Fred Becklinger
G. P. Thomas
INVENTOR.
William Merrill.
By Jas. E. Thomas Atty.

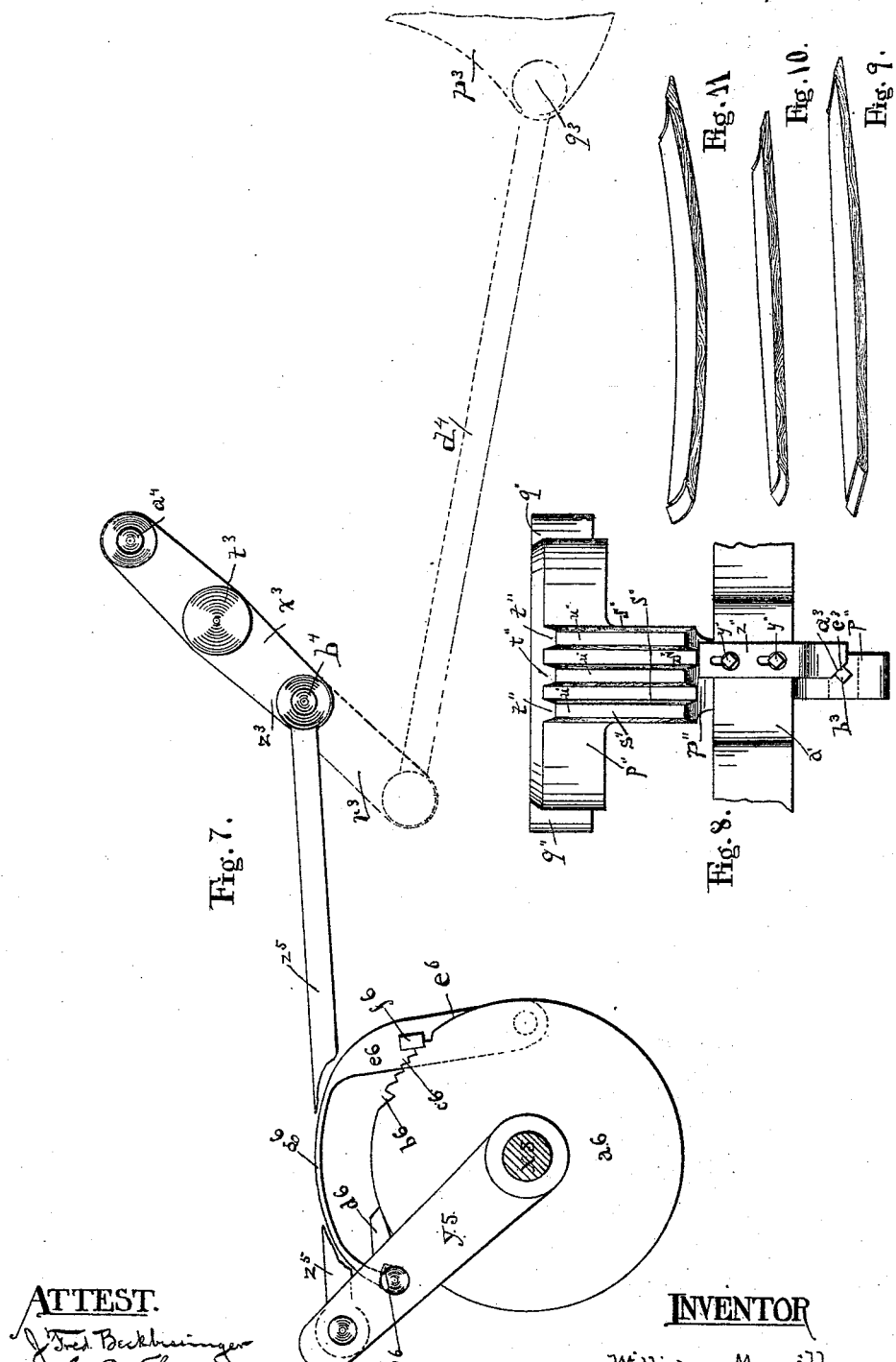

(No Model.) 11 Sheets—Sheet 6.
W. MERRILL.
BARREL MACHINE.
No. 454,915. Patented June 30, 1891.
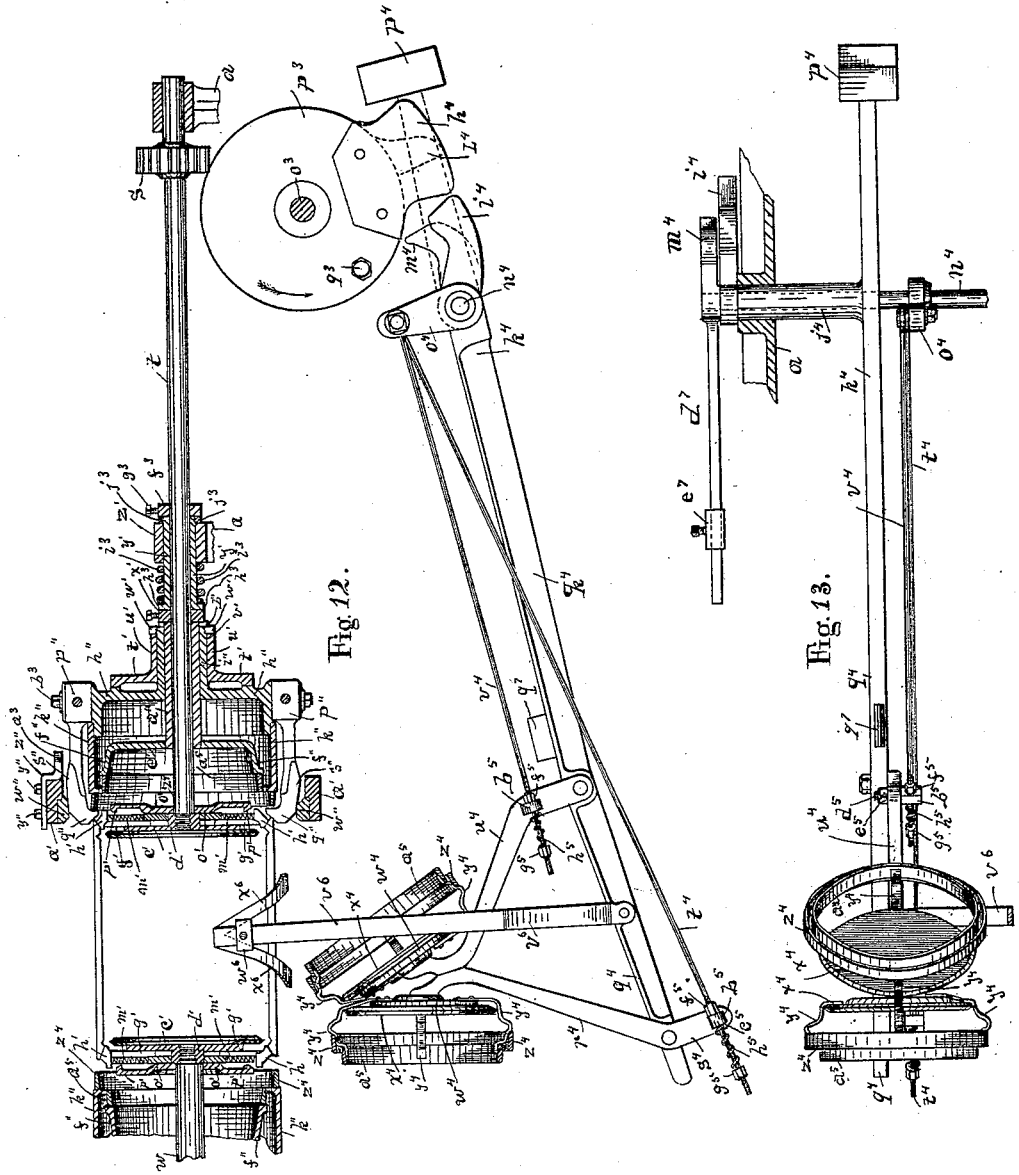
ATTEST:
J. Fred Beckbissinger
G. P. Thomas
INVENTOR.
William Merrill.
By Jas. E. Thomas Atty.

(No Model.) 11 Sheets—Sheet 7.

W. MERRILL.
BARREL MACHINE.

No. 454,915. Patented June 30, 1891.

ATTEST.
J. Fred Deckhissinger
G. P. Thomas

INVENTOR
William Merrill.
By Jas. E. Thomas, Atty.

(No Model.) 11 Sheets—Sheet 8.
W. MERRILL.
BARREL MACHINE.
No. 454,915. Patented June 30, 1891.
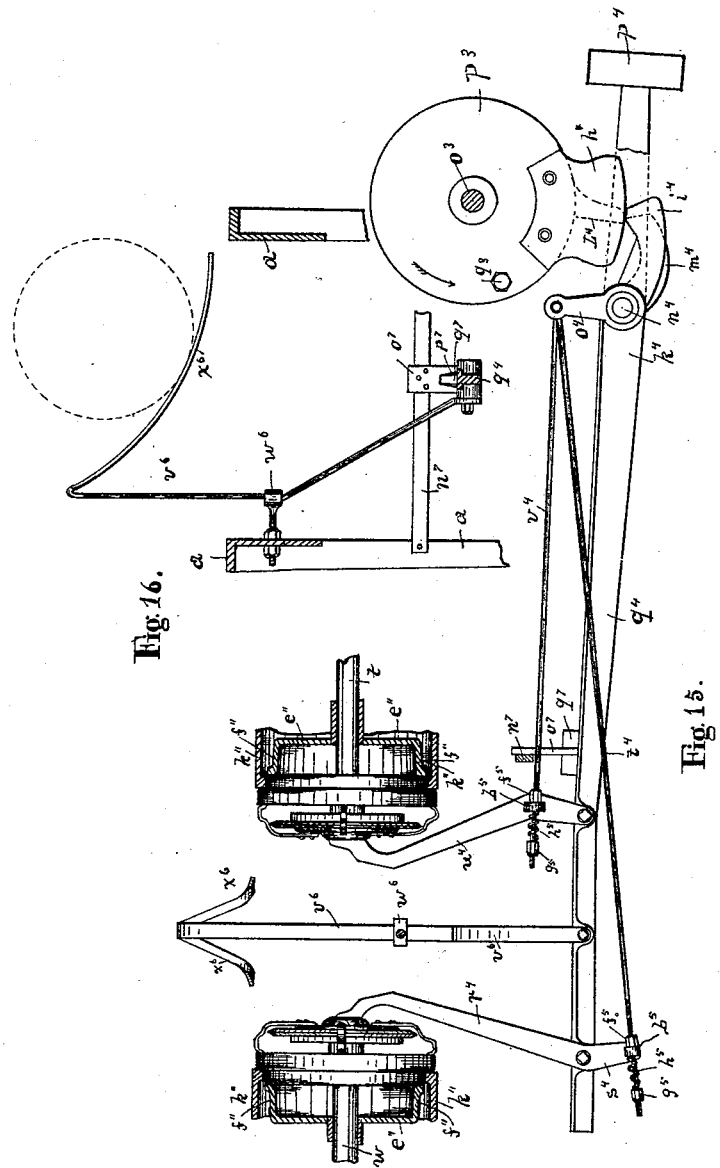
ATTEST.
Fred Beckhusinger
G. P. Thomas
INVENTOR.
William Merrill.
By Jas. E. Thomas, Atty.

(No Model.) 11 Sheets—Sheet 9.

W. MERRILL.
BARREL MACHINE.

No. 454,915. Patented June 30, 1891.

ATTEST.
Fred Becklissinger
G. P. Thomas

INVENTOR.
William Merrill.
By Jas. E. Thomas Atty

THE NORRIS PETERS CO., PHOTO-LITHO., WASHINGTON, D. C.

(No Model.)

11 Sheets—Sheet 10.

W. MERRILL.
BARREL MACHINE.

No. 454,915.

Patented June 30, 1891.

ATTEST.
J. Fred Beckbissinger
G. P. Thomas.

INVENTOR.
William Merrill.
By Jas. E. Thomas Atty.

(No Model.) 11 Sheets—Sheet 11.

W. MERRILL.
BARREL MACHINE.

No. 454,915. Patented June 30, 1891.

ATTEST

INVENTOR.

William Merrill.
By Jas. E. Thomas. Atty.

UNITED STATES PATENT OFFICE.

WILLIAM MERRILL, OF EAST SAGINAW, MICHIGAN.

BARREL-MACHINE.

SPECIFICATION forming part of Letters Patent No. 454,915, dated June 30, 1891.

Application filed March 31, 1890. Serial No. 346,098. (No model.)

*To all whom it may concern:*

Be it known that I, WILLIAM MERRILL, a citizen of the United States, residing at East Saginaw, in the county of Saginaw and State of Michigan, have invented certain new and useful Improvements in Barrel-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in machines for making barrels and kegs, and is arranged especially as a machine for performing automatically all of the several operations required to form and complete a barrel after the hoops and heads are provided of the proper dimension and the required staves are furnished of a uniform width and proper form and with the ends thereof prepared to receive the heads.

The first part of my invention relates to devices for automatically placing the hoops and heads in position in the stave-assembling devices.

The second part relates to devices for automatically feeding into the assembling devices the proper number of staves required for a barrel; and the third part of the invention relates to devices for automatically assembling the staves in a cylindrical form, in automatic devices for bending the ends of the staves inwardly to effect the engagement thereof with the heads, in devices for forcing the hoops upon the opposite ends of the barrel, and in devices for automatically releasing and delivering the finished barrel from the machine.

My invention consists in the combination and arrangement of the various elements and contrivances which I use in the construction and operation of the machine, whereby the several operations of constructing and finishing a barrel or keg are consecutively performed in their proper order, as I hereinafter more definitely explain, and set forth in detail in the claims of this specification.

One of the objects of the invention is to provide a machine whereby the work of forming and perfecting a barrel after the staves, hoops, and heads are provided may be performed without the aid of hand labor.

Another object of the invention is to provide means whereby barrels may be quickly and rapidly made of a uniform size and quality, and also at a reduced cost.

I attain these objects by means of the devices illustrated in the accompanying drawings, in which—

Figure 2:
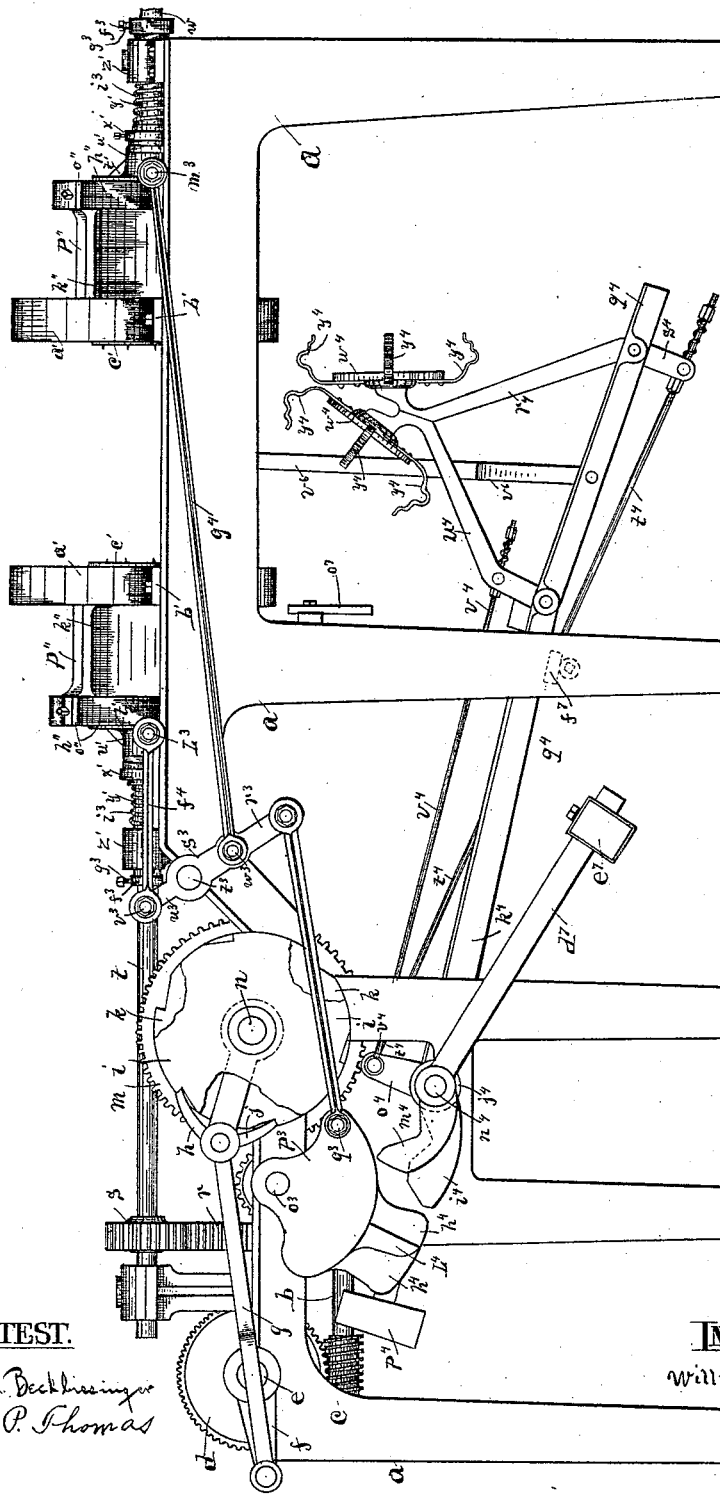
Figure 14:
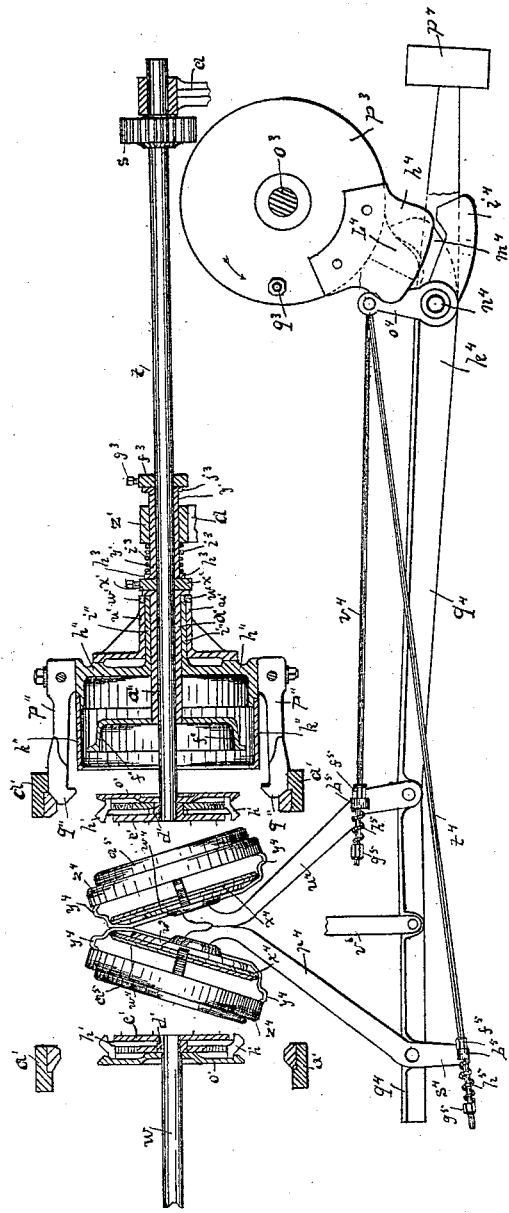
Figures 17, 18, 19:
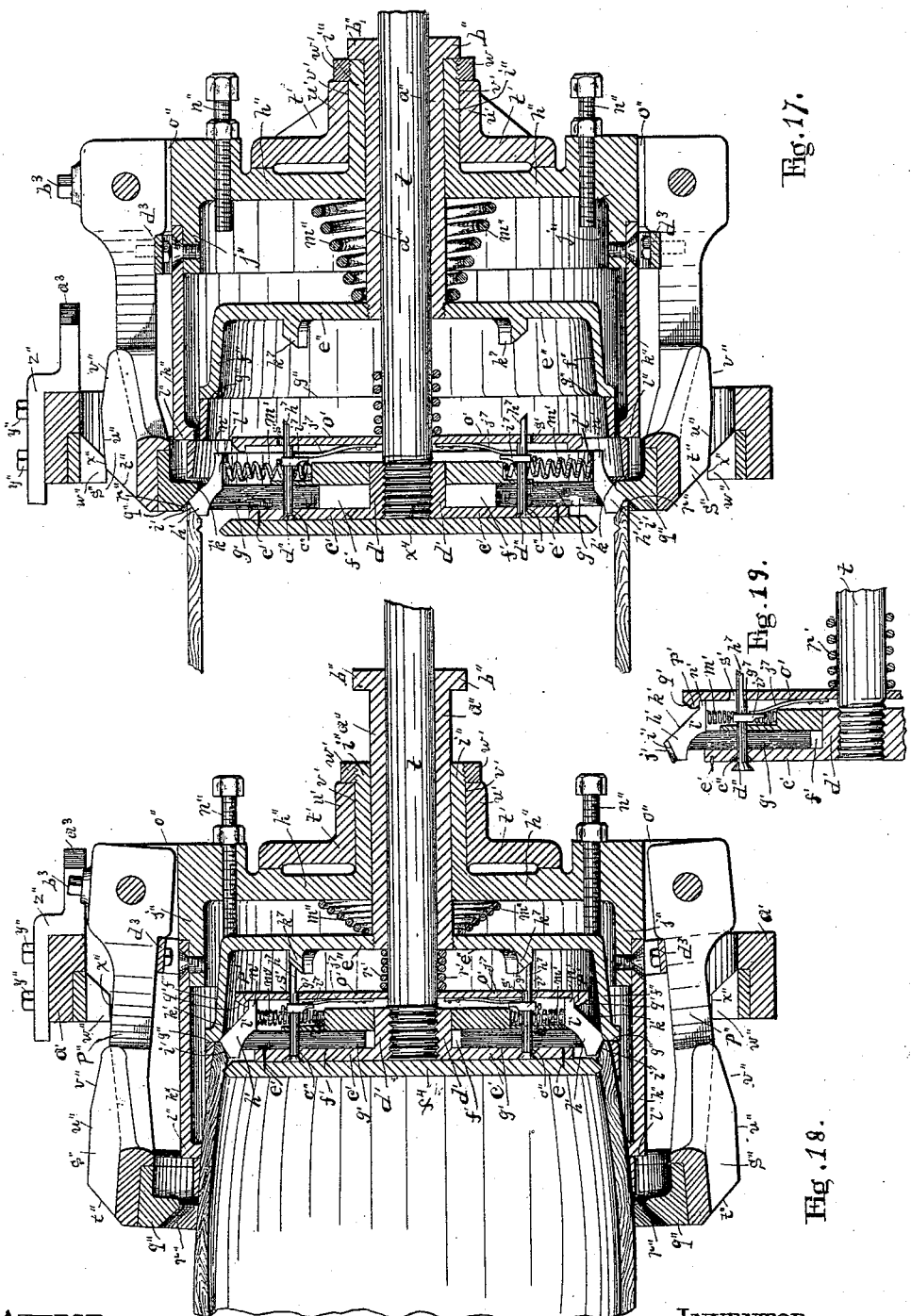

Figure 1 is a plan view of my improved barrel-machine. Fig. 2 is a view in elevation of the front side of the same. Fig. 3 is a side view in elevation of the feeding devices with a sectional portion of the frame, &c., and showing the position of the same when feeding in the last stave. Fig. 4 is a section of Fig. 3, taken at $x\,x$. Fig. 5 is a portion of the same with the parts in position before the feeding operation is begun. Fig. 6 is a side view in elevation of the mechanism for operating the stave-feeding devices detached, and showing the position of the parts when ready to retreat the feeding-arms. Fig. 7 is the same after the arms are retreated and ready to feed the staves forward. Fig. 8 is a plan view of one of the clamping-ring sections and portion of bending-ring. Fig. 9 is a view in perspective of an ordinary flat stave. Fig. 10 is the same of a stave having concavo-convex surfaces. Fig. 11 is the same of a stave having concavo-convex surfaces and formed with a longitudinal bend. Fig. 12 is a vertical section of the assembling, clamping, and hoop-driving mechanism with the parts in position before the clamping operation begins, and also showing the hoop and head placing devices in position ready for operation. Fig. 13 is a top or plan view of the hoop and head placing mechanism. Fig. 14 is a view of the devices shown in Fig. 12, with the devices in position when the operation of placing the hoops and heads in the machine is partly performed. Fig. 15 is the same, showing the position of the several devices in the last part of the operation of placing the hoops and heads in the machine. Fig. 16 is a side view in elevation of the barrel-ejector with section of the frame and operating-lever. Fig. 17 is a vertical central section of the stave-assembling devices on an enlarged scale with the bending and hoop-driving mechanism in position before the bending operation. Fig. 18 is the same with the clamping devices released and with the hoop-driving mechanism in position at the end of the driving operation. Fig.

Figure 21:
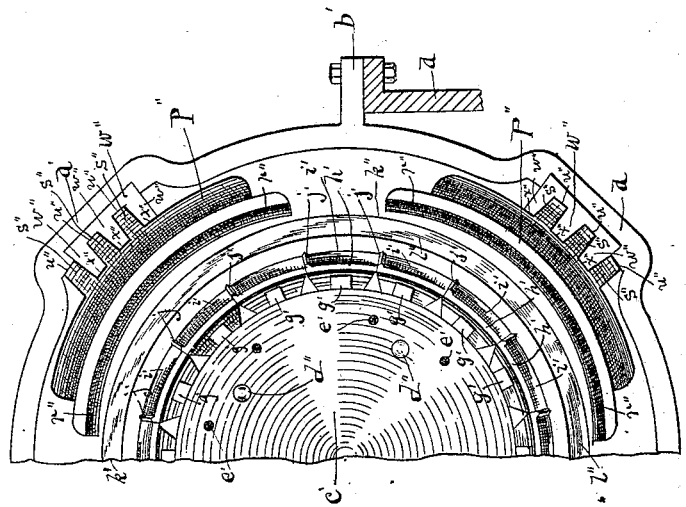
Figure 20:
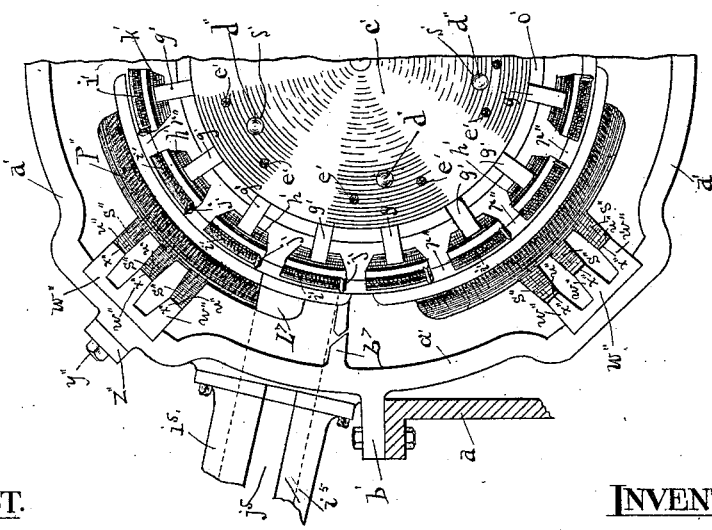
Figure 22:
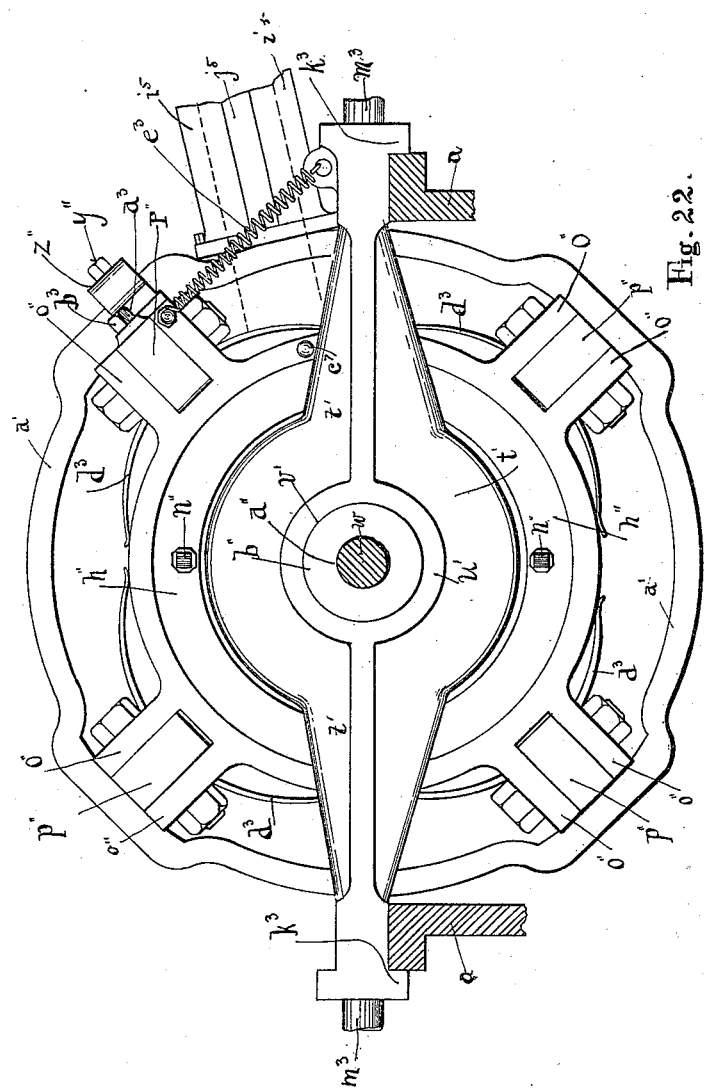

19 is a portion of Fig. 18 detached. Fig. 20 is an end view, partly sectional, of the parts in position as shown in Fig. 17. Fig. 21 is an end view of the same with the parts in the position shown in Fig. 18. Fig. 22 is a view of the outer or rear end of Fig. 17 with section of frame.

The same letters or characters of reference will be found indicating the same parts throughout the several views.

$a$ represents the frame of the machine, and $b$ is a counter-shaft journaled to the frame, and is provided with a suitable pulley or other devices, whereby motion is imparted thereto from suitable power, and is also provided with a worm-screw $c$, which intermeshes with a worm-wheel $d$, mounted upon a shaft $e$, placed across and journaled upon the outer end portion of the frame $a$, and upon the outer end of the shaft and upon the front side of the frame is a crank $f$, upon which is journaled one end of an arm $g$, which extends along the front side of the frame and is provided on its opposite end and pivotally secured thereto with the pawl $h$, reaching upwardly and engaging with a ratchet-wheel $i$, and also with the pawl $j$, reaching downwardly and engaging with the ratchet-wheel $k$. This ratchet-wheel $k$ is mounted upon a sleeve $l$, which extends partly across the machine-frame, and is journaled thereto at a point adjacent to the wheel, and is also provided at its inner end and near the central portion of the machine-frame with a gear-wheel $m$, and through the sleeve $l$ is passed a shaft $n$, carrying on its outer end the ratchet-wheel $i$, while its inner end portion extending beyond the inner end of the sleeve is journaled upon the frame and provided with a miter gear-wheel $o$, mounted thereon and intermeshing with a miter gear-wheel $p$, which is mounted upon the shaft $q$. This shaft $q$ extends nearly the entire length of the frame $a$, which is provided with suitable boxes for carrying the shaft, and upon one end of the shaft and adjacent to the shaft $e$ is mounted a gear-wheel $r$, which intermeshes with the gear-wheel $s$, carried by the outer end of a shaft $t$, which is journaled upon the frame above and parallel with the shaft $q$ and extends for a portion of the length of the frame. Upon the other or opposite end of the shaft $q$ is mounted a gear-wheel $u$, a duplicate in dimension of the wheel $r$, and intermeshes with a gear-wheel $v$, which is a duplicate of the wheel $s$, and is mounted upon the outer end of the shaft $w$, which is carried by the frame and arranged to lie parallel with the shaft $q$ and in alignment with the shaft $t$ and with its inner end reaching toward the inner end of the shaft $t$, leaving, however, a space between the ends of the shafts which is slightly greater than the length of the barrel or keg to be formed.

$a'$ are two rings strongly made and located across the machine-frame in such positions that their adjacent edges will nearly coincide with the inner ends of the shafts $w$ and $t$, and these rings are provided on opposite sides with outwardly-projecting lugs $b'$, which rest upon and are secured rigidly to the frame $a$ by suitable bolts. (Shown in detail in Figs. 1, 2, 17, and 18, to which, together with Figs. 19, 20, and 21, attention is especially called in the description following.)

$c'$ are two face-plates, each provided on their rear sides with centrally-projecting hub portions $d'$, into each of which is passed the inner end of one of the shafts $t$ and $w$, so that the faces or plane sides of the plates stand facing each other, and are each provided with a series of outwardly-projecting spurs $e'$.

The rear or inner sides of the plates $c'$ are provided with a series of radial grooves $f'$, and $g'$ are a series of radial arms fitted to lie easily in the grooves and to project beyond the peripheries of the plates, where they each terminate with a stave-support $h'$. This support $h'$ projects laterally on each side of the arm, so that the lateral dimension thereof will approximate the lateral dimension of a stave at the ends, and the outer face $i'$ of the supports is formed with a bevel closely corresponding with the bevel of the chamfered end of a stave, and at one end of each of the supports the face $i'$ is provided with an outwardly-raised rib $j'$. The inner or rear face of the supports is provided with a beveled or sloping face $k'$, and this portion is also extended inwardly, so as to form a projecting step $l'$, between which and the hubs $d'$ are placed springs $m'$, arranged to move the arms $e'$ outwardly in the grooves, or to allow the arm to be moved inwardly in the grooves, for a purpose to be presently explained. The step portion $l'$ is extended inwardly beyond the spring, and its outer face is formed into a catch $n'$, and $o'$ are disks or circular catch-plates loosely mounted upon the shafts $t$ and $w$ behind the hubs $d'$, and are provided on their peripheral edges with a forwardly-projecting flange $p'$, the inner side of which is at a right angle with the plate, and the outer side of its periphery is formed with a bevel $q'$, and $r'$ are springs loosely coiled about the shafts behind the plates $o'$ for actuating the plates toward the stave-supports during the hoop-driving operation, as will be hereinafter explained, the plates and springs remaining free upon the shafts at other times.

The face-plates $c'$ are provided with several transverse openings $c''$, through which are loosely fitted the releasing bolts or pins $d''$, and the inner ends $h^7$ of these pins also extend through openings $s'$, which are provided in the catch-plates $o'$, and are provided on their middle portions with a shoulder $g^7$ and with a lug $i^7$, which engages a spring $j^7$ for pushing the bolts outwardly to project their ends from the openings on the front side of the face-plates.

$a''$ are sleeves passed over the shafts $t$ and $w$, and these sleeves are provided on their outer ends with radially-projecting flanges $b''$, and upon the inner ends of the sleeves are secured by a screw-thread the chine-hoop drivers $e''$, which project radially around the sleeve and are provided with a rim portion $f''$, which projects outwardly and has on its outer edge a face $g''$, which bears against the edge of the hoop when forcing the hoop on the barrel. These hoop-drivers are also provided on their inner sides with forwardly-projecting lugs or rims $k^7$, which are located so as to engage with and lift the inner ends $h^7$ of the releasing-pins $d''$ as the driver comes forward for placing the hoops on the barrel.

$h''$ are heads of circular form, each provided with a central hub or sleeve portion $i''$, projecting from its outer side, and provided with a central opening and passed upon the sleeves $a''$, with the outer end of the hub against the flanges $b''$, and upon the inner edge of the peripheries of the heads are arranged the inwardly-projecting rims $j''$, and $k''$ are drivers for the quarter-hoops, the back edges of which surround or overlap and are secured to the rims $j''$ by bolts, and, extending inwardly beyond the inner face of the drivers $e''$, are each provided with a driving-face $l''$, and $m''$ are coiled springs between the heads $h''$ and the drivers $e''$, which allow the heads $h''$ to move inward and force the drivers $k''$ upon the staves, while the drivers $e''$ remain at rest until the bolts $n''$, which are passed through the heads $h''$, impinge against the outer sides of the drivers $e''$.

Upon the peripheries of the heads $h''$ are provided the radially-projecting lugs $o''$, placed in pairs, and between each pair of these lugs $o''$ are pivoted the outer ends of the clamping-arms $p''$, preferably a series of four arms being arranged for each head, and the inner ends of the arms, which reach to the beveled face $i'$ of the stave-supports, are provided on their inner sides with inwardly-projecting ring-sections $q''$, which also extend laterally upon each side of the arms, so that their adjacent ends nearly or quite reach each other, and so that each set or series of sections forms a ring, which substantially surrounds the barrel, and with the inner face $r''$ thereof sloping inwardly to correspond to the slope $k'$ of the stave-supports, and forming complete rings having conical openings with the greatest area of the openings presented outwardly or toward the staves.

Upon the outer sides of the inner or free ends of the arms $p''$ are arranged outwardly-projecting longitudinal ribs $s''$, the front ends of which are provided with an abrupt backward slope or beveled face $t''$, while the outer face $u''$ is slightly inclined outwardly until the face $v''$ is reached, and the face $v''$ is inclined or dipped toward the pivoted end of the arm and terminates with the upper surface of the arm. At points coinciding with the arms the rings $a'$ are raised outwardly to provide suitable space between the arms and the rings, and to the inner sides of these raised portions are secured the short ribs $w''$, arranged to lie transversely with the ring and to coincide with the ribs $s''$, so that when the parts are in the position shown in Figs. 17 and 20 the outer face of the ribs $s''$ will bear against the inner face $x''$ of the ribs $w''$; but on being placed in the position shown in Figs. 18 and 21 the ribs $s''$ will pass between the ribs $w''$ and allow the arms to open outwardly, for a purpose which I shall hereinafter explain.

Upon the outer surface of the raised portions of the rings $a'$ are adjustably secured by bolts $y''$ the pieces $z''$, which, projecting back beyond the rings and toward the pivoted end of the arms $p''$, are provided on one side with a beveled or sloping face $a^3$, and the outer side of the pivoted end of the arms is provided with a projecting head $b^3$, having a beveled side $c^3$, which, as the heads $h''$ are moved inwardly to the position shown in Fig. 18, engage with the beveled face $a^3$ and cause the heads to turn upon the sleeves $a''$ and oscillate the arms slightly to allow the ribs $w''$ to pass between the ribs $s''$, and the free ends of the arms are moved outwardly, actuated by the springs $d^3$, which are arranged beneath the arms and bear against the peripheries of the heads $h''$, while the heads and arms are oscillated back to their original position by the coiled springs $e^3$ as the heads are pushed outwardly to free the heads $b^3$ from the pieces $z''$.

$t'$ are cross-heads placed across the machine-frame behind the heads $h''$, and are provided in their middle portions with hubs $u'$, projecting outwardly, and through the hubs and cross-heads are arranged openings $v'$, which are passed over the sleeves or hubs $i''$, and are held thereon by nuts $w'$ upon the outer ends of the hubs.

$x'$ are collars placed upon the shafts $t$ and $w$ against the outer ends of the sleeves $i''$ and held by a set-screw rigidly to the shafts, and $y'$ are sleeves upon the shafts $t$ and $w$ outside of and against the collars $x'$, and these sleeves, extending along the shafts, are passed through the boxes $z'$, which are supported by the frame $a$, and the sleeves are held against a longitudinal movement on the shafts by collars $f^3$, rigidly secured to the shafts by set-screws $g^3$, which also allow the sleeves to be adjusted longitudinally to any desired position.

The inner ends of the sleeves $y'$ are provided with peripheral flanges or shoulders $h^3$, and $i^3$ are coiled springs surrounding the sleeves, with one end of the springs bearing against the flanges $h^3$ and with their opposite ends against the inner end surfaces of the boxes $z'$, which allows an outward movement of the shafts and sleeves through the boxes to be obtained on power being applied thereto to overcome the tension of the springs, and the shafts may rotate either in the sleeves or with the sleeves in the boxes, and $j^3$ are threaded nuts placed upon the outer ends of the sleeves $y'$ and outside of the boxes $z'$, whereby a fine and accurate adjustment of the movement of the sleeves in the boxes may be obtained.

Each end of the cross-heads $t'$ rests upon the frame $a$ and is properly arranged with projections $k^3$ to retain the cross-heads in position, and projecting outwardly from the ends of the cross-heads are wrist-pins $L^3$ and $m^3$.

The gear-wheel $m$ intermeshes with a gear-wheel $n^3$, mounted upon a shaft $o^3$, which is journaled in boxes on the frame, and, projecting on the front side of the frame, is provided with a cam-support $p^3$, mounted thereon, and this cam-support is provided with a wrist-pin $q^3$, which forms a crank movement as the shaft is revolved, and $d^4$ is a connecting-rod with one end pivotally mounted upon the wrist $q^3$ and with its opposite end pivotally secured to the lower or long arm $r^3$ of the rock-bar $s^3$, which is mounted upon one end of a shaft $t^3$, placed across the frame in suitable boxes. The rock-bar $s^3$ is also provided with a short arm $u^3$, extending in the opposite direction from the arm $r^3$ and having on its outer end a wrist $v^3$, and $w^3$ is a wrist projecting from the arm $r^3$ at a distance from the shaft $t^3$ coinciding with the radial distance of the wrist $v^3$. Upon the opposite end of the shaft $t^3$, which also projects upon the rear side of the frame, is mounted a rock-bar $x^3$, having arms $y^3$ and $z^3$, projecting in opposite directions and coinciding in length and position relative to the shaft to that of the short arm $u^3$ on the opposite end of the shaft, and the upper arm $y^3$ of the rock-bar is provided with a wrist $a^4$, while the lower arm $x^3$ has a wrist $b^4$.

$c^4$ is a connecting-rod with one end mounted on the wrist $a^4$ and with its opposite end upon the wrist $L^3$ on one cross-head on the rear side of the machine, and $e^4$ is a connecting-rod with one end mounted upon the wrist $b^4$ and with its opposite end mounted on the wrist $m^3$ of the other cross-head.

On the opposite or front side of the machine is a connecting-rod $f^4$, corresponding in length to the rod $c^4$, and is mounted by one end upon the wrist $v^3$ and by its opposite end upon the other wrist $L^3$, and $g^4$ is a connecting-rod corresponding to the rod $e^4$, and is mounted by one end upon the wrist $r^3$ and by the opposite end upon the other wrist $m^3$.

Projecting radially from the cam-support $p^3$ is a cam $h^4$, which engages as the support is revolved with an arm $i^4$, permanently mounted on the outer end of a sleeve $j^4$, and the sleeve, extending partly across the machine-frame, is supported by a suitable box at its outer end, and to its inner end is firmly secured a lever $k^4$.

$L^4$ is a cam projecting from the support $p^3$ beside the cam $h^4$, and this cam, when the support is revolved, engages with an arm $m^4$, projecting from a shaft $n^4$, passed through the sleeve $j^4$, which supports the front end thereof, and, extending across the frame $a$, the shaft is supported at its inner end by a suitable box upon the frame, so that this shaft also acts as a support for the inner end of the sleeve $j^4$ and the lever $k^4$, and $o^4$ is an upwardly-projecting arm rigidly secured upon the shaft $n^4$. (See Figs. 12, 13, 14, and 15.) The lever $k^4$ extends along the central portion of the machine beneath the assembling and clamping devices, while a shorter arm extends in the opposite direction and is provided with a counter-weight $p^4$.

To the outer end of the arm $q^4$ of the lever $k^4$ is pivoted an upwardly-projecting lever $r^4$, with a short arm $s^4$ extending below the pivot, and to the lower end of this arm $s^4$ is pivotally secured one end of a rod $t^4$, while the opposite end of the rod is pivoted to the outer end of the arm $o^4$. Upon the arm $q^4$, at a short distance from the lever $r^4$, is pivoted by its lower end an upwardly-projecting lever $u^4$, and to this lever, at a proper distance from its pivotal point, is pivotally secured one end of a rod $v^4$, the opposite end of the rod being pivoted to the outer end of the arm $o^4$.

The outer free ends of the twin levers $r^4$ and $u^4$ are bent toward each other, and to the opposite or outer sides of the upper ends of each is secured a disk $w^4$, upon which to place barrel-head $x^4$, and upon the disk $w^4$, and projecting outwardly and forwardly therefrom, are secured a series of arms $y^4$ of thin metal, bent to a suitable form to receive and loosely support the quarter-hoops $z^4$, also the smaller chine-hoops $a^5$, and these arms also support loosely the heads $x^4$ upon the disks $w^4$.

The pivotal connection of the rods $t^4$ and $v^4$ consists of a head portion $b^5$, having a transverse opening, through which is passed the rod, and a shank $d^5$ projects from the head through the lever, and is secured therein by a nut $e^5$ upon the opposite side thereof to allow the shank to oscillate in its bearing, and the length of the rod may be adjusted by a nut $f^5$ upon the rod and against the inner side of the head $b^5$ and a nut $g^5$ on the end portion of the rod which projects through the head, and coiled springs $h^5$ are placed around the projecting ends of the rods between the nuts and heads $b^5$ to form a cushioning action for the levers against a sudden jar.

$v^6$ is a barrel-ejecting arm, with its lower end pivoted to the lever $k^4$ about midway between the lower pivoted ends of the levers $r^4$ and $u^4$, and this arm, first being bent backward, has a straight portion passed through a guide-piece $w^6$, secured to the inner side of the frame $a$, and at its upper end the arm is provided with two diverging portions or arms $x^6$, which are curved downwardly and curved forwardly and extended nearly across the machine-frame and are arranged to be located below the barrel when the lever $k^4$ is lying at rest in the position shown in Figs. 2 and 12 and to be raised upwardly to lift the finished barrel out of the machine when the lever $k^4$ is in the position shown in Figs. 15 and 16.

Referring now more especially to Figs. 3, 4, and 5, $i^5$ are stave-carrying ways, with their inner ends firmly bolted to the rear peripheries of the compression-rings $a'$ just above the lugs $b'$ and extending outwardly and preferably in a position coincident with the radius of the rings. The ways are each provided with a longitudinal slot $j^5$, and in these slots are placed the heads $k^5$, properly secured in position, so that they may easily slide to and fro in the slots, and to the portions of the heads projecting outside of the ways are pivoted at $L^5$ the outer ends of the arms $m^5$, while the inner ends of the arms which project toward the rings $a'$ reach through the slots and project between the ways, being capable, however, of springing outward, so as to move entirely within the slots, and $n^5$ are springs secured to the inner end portions of the arms and with their outer free ends bearing against the outer portions of the heads and arranged to actuate the inner free ends of the arms $m^5$ inwardly. The outer ends of the ways $i^5$ are supported by downwardly-extending frame portions $o^5$, which, turning inward, are secured to the frame $a$, and at a proper distance below the ways and supported by the frame-pieces $o^5$ is a shaft $p^5$, to which by one end are rigidly secured the arms $q^5$, extending upwardly on the outer sides of the ways and provided on their upper ends with slots $r^5$, through which and into the heads $k^5$ are passed the bolts $s^5$. $t^5$ is an arm rigidly secured by one end to the shaft $p^5$, and is provided on its outer end with a weight $u^5$, and is preferably located beneath and midway between the ways. Upon the outer end of the shaft $p^5$ is mounted a miter-gear $v^5$, which intermeshes with the gear $w^5$, mounted on a shaft $x^5$, supported by a bracket extending from the frame portion $o^5$ and the main frame $a$. $y^5$ is an arm loosely mounted at its lower end upon the shaft $x^5$, and to its upwardly-extending free end is pivoted one end of a connecting-rod $z^5$, the opposite end of the rod being pivoted to the lower arm $z^3$ of the rock-bar $x^3$. $a^6$ is a disk securely mounted on the shaft $x^5$ behind the arm $y^5$, and is provided on its upper peripheral surface with a notch $b^6$, and also with a series of notches $c^6$, and $d^6$ is a pawl pivoted by one end to the arm $y^5$ below the outer end thereof, while its opposite free end rests upon the peripheries of the disk and engages with the notch $b^6$ as the arm is oscillated forwardly.

Referring now to Figs. 6 and 7, $e^6$ is an arm pivoted by its lower end to a projecting support on the frame $a$, and, extending upwardly, is provided with a catch $f^6$, projecting outward from its front side over the disk $a^6$, so as to engage with one of the notches $c^6$ when in a suitable position, as will be hereinafter explained, and above the catch the arm is bent or curved, so as to allow the portion $g^6$ thereof to reach over and behind a portion $h^6$, which projects inwardly from the pivoted end of the pawl $d^6$ or from some convenient portion of the arm $y^6$. Across the frame portion $o^5$ and below the ways $i^5$ is placed a shaft $i^6$, and upon the outer end of this shaft is mounted a sprocket-wheel $j^6$, carrying a link belt $k^6$, (see Fig. 1,) which is also passed over a sprocket-wheel $L^6$, carried by a counter-shaft $m^6$, extending along the outside of the frame $a$ and supported thereby in suitable boxes projecting therefrom, and on the opposite end of this shaft is mounted a gear-wheel $n^6$, intermeshing with a gear-wheel $o^6$, carried by the shaft $q$. Mounted on the shaft $i^6$ are sprocket-wheels $p^6$, located between the ways $i^5$ and with the upper portions of their peripheries in proximity to the inner sides of the ways, and over these sprockets are passed the carrying-chains $q^6$, the opposite end of the runs of chain being supported by similar or other convenient sprockets. These chains are intended to receive and carry the staves to the feeding devices, with their lower edges resting upon the chains and with their inner sides presented to the machine, and for this purpose the chains are composed of a series of links $r^6$, pivoted to each other end to end, and each link is provided with a series of upwardly-projecting teeth $s^6$, leaving between each of the adjacent links a space $t^6$, in which to place the stave edgewise or with its lower edge resting on the bottom of the space $t^6$. At suitable intervals the chains are provided with a tooth $u^6$, extending to a considerable distance above the remaining teeth of the series. The stave-carrying ways $i^5$ are provided on their inner sides and below the slots with inwardly-projecting flanges $a^7$, upon which the lower edges of the ends of the staves rest, and $b^7$ are portions of the ways extending inwardly between the ring-sections $q''$ for supporting the staves until they are taken off by the assembling devices one by one and formed into the barrel, the ring-sections $q''$ being cut away at $L^7$ to admit the staves to the stave-supports $h'$. (See Fig. 20.) The chains $q^6$ are of any suitable length, and are provided with the teeth $u^6$ at such intervals of space as to leave the required number of spaces $t^6$ between the teeth to contain the proper number of staves to form a barrel, so that no counting of the staves is required, and the staves are of course of a uniform width and dimension, having been finished by having been passed through any suitable machine for properly crozing and chamfering the ends in the required form to receive the heads and for properly jointing the edges, preferably, however, the improved stave-finishing machine described in my application, Serial No. 330,655, and which is intended to be used in conjunction with the present devices.

The staves being placed in the spaces $t^6$, the chain, which is provided with an intermittent motion, carries them forward toward the assembling devices, and as the chains pass downward over the sprockets $p^6$ the staves are left standing with their edges resting on the flanges $a^7$, the first stave being pushed forward by each succeeding stave until the last of the series is delivered from the chains by the long teeth $u^4$ pushing the whole series forward and in position to be caught in the rear by the arms $m^5$ and carried forward toward the assembling devices by the action of the weight $u^6$ on the arm $t^5$, which oscillates the shaft $p^5$ and arms $q^5$ forwardly.

Motion is imparted to the machine through the shaft $b$ being connected to suitable power, and the shaft $e$, the worm-wheel $d$, and crank $f$ are given one revolution, and the forward motion of the crank through the arm $g$ and pawl $h$, which engages with a notch in the ratchet-wheel $i$, imparts to the shaft $n$ one-third of a revolution, which, through the miter-gears $o$ and $p$, imparts also one-third of a revolution to the shaft $q$ and the gear-wheels $r$ and $u$, and these, intermeshing with the pinions $s$ and $v$ impart a full revolution to the shafts $t$ and $w$. The assembling devices carried by the shafts $t$ and $w$ are also revolved once, and the series of staves being pushed inwardly by the arms $m^5$ brings the forward stave in position with its chamfered ends resting on the face $i'$ of the stave-supports $h'$ and with the projecting ribs $j'$ thereon resting beneath the lower edges of the stave, and as the devices are revolved the stave is carried upward, the remaining staves of the series are pushed forward, and the next stave is caught and carried along by the next succeeding supports $h'$ and ribs $j'$ until the revolution of the devices is ended, and the staves will then be arranged in the form of a cylinder with the middle portions of their adjacent edges touching each other and in position for clamping and receiving the hoops, the heads being already in position on the face-plate. As the crank $f$ passes over the remaining portion of its revolution the arm $g$ and the pawl $j$ are drawn backward, and the pawl $j$, engaging with a notch in the ratchet-wheel $k$, imparts to the sleeve $l$ and the gear-wheel $m$ one-third of a revolution, and the gear $m$, intermeshing with the pinion $n^3$, imparts a full revolution to the shaft $o^3$ and the cam-support $p^3$ and wrist-pin $q^3$, which, moving rearwardly through the lower portion of its circle by means of the connecting-rod $d^4$, oscillates the lower arms of the rock-bars $s^3$ and $x^3$ rearwardly, and the upper arms of these bars, moving forwardly during the first part of the revolution, impart through the connecting-rods $c^4$ and $f^4$ an outward movement to one cross-head $t'$, while the lower arms, moving backwardly, impart through the connection-rods $e^4$ and $g^4$ an inward movement to the other cross-head $t'$, and as these cross-heads are moved toward each other the heads $h''$ and arms $p''$ are moved inwardly, and the faces $r''$ of the ring-sections $q''$, thus being forced over the narrow ends of the staves, spring the ends of the staves inwardly and upon the heads $x^4$, with the beveled edges of the heads in engagement with the croze in the staves as the ring-sections $q''$ are moved farther inward, the outer inclined faces $u''$ causing the ring-sections $q''$ to close inwardly as they move forward, and at the same time the drivers $k''$, following the ring-sections, force the quarter-hoop over the ends of the compressed staves until the inner ends of the bolts $n''$ come in contact with the outer side of the driver $e''$, and all of the drivers and hoops are then carried forward until the hoops are in place on the barrel, the sloping faces $k'$ serving to guide the hoops over the ends of the staves, and when the quarter-hoops have been pushed on the staves to a sufficient distance to retain the staves in position the inclined faces $u''$ will have reached a point to be clear of contact with the short ribs $w''$, and the backwardly-sloping faces $v''$ then allow the arms to gradually expand by the action of the springs $d^3$ until the heads $b^3$ engage with the sloping face $a^3$ of the pieces $z''$, which causes the heads and arms to revolve or oscillate slightly, and the arms are then expanded outwardly and in a position so that the ribs $s''$ will pass between the ribs $w''$ as the arms are carried backward on the reverse movement. In the meantime as the staves are bent by the ring-sections $q''$ the supports $h'$ are moved inwardly, the arms $g'$ sliding in the radial grooves and compressing the springs $m'$, and as the drivers $e''$ move inwardly the projecting lugs $k^7$ thereon engage with the inner sides of the ends $h^7$ of the releasing-bolts and raise them outwardly, so that the shoulders $g^7$ thereon will be freed from contact with the plates, and in unison with this operation the drivers press inwardly upon the springs $r'$, which in turn force the plates inward, and as the drivers $e''$ come to the end of their inward movement the inner edges of their driving-faces $g''$ engage upon the upper sloping face $k'$ of the supports and force the supports still farther toward the shafts, which frees the ribs $j'$ from contact with the staves and brings the catch portions $n'$ in engagement with the catch-rims $p'$ on the plates, so that the stave-supports are retained thereby in a collapsed position until the hoops for the next barrel are placed in position for driving. The barrel is now completed and the wrist $q^3$ has reached the limit of its forward movement in the first half of its revolution and starts backwardly on the last half of the revolution, which oscillates the rock-arms in the opposite direction, moving the clamping-arms, ring-sections, and heads $h''$, also the hoop-drivers, outwardly in opposite directions, with the clamping-arms extended, until the outer ends of the sleeves $a''$ engage with the collars $x'$, and then the shafts $t$ and $w$, with the cross-heads, the driving-heads, and clamping-arms, the stave-supports, and head-supports, are moved outwardly together, the sleeves $y'$ sliding outwardly through the boxes $z'$; but as a point in the movement is reached where the heads $b^3$ are freed from contact with the pieces $z''$ the heads then are retained from oscillation by the ribs $s''$ intermeshing with the ribs $w''$, and as the rock-bars reach nearly to the end of the backward oscillation the ribs $s''$ pass beyond the ribs $w''$, and then the springs $e^3$ operate to oscillate the heads $h''$ and arms $p''$ to their original position, suitable stops $c^7$ being provided on the heads $h''$, which engage with the cross-heads $t'$; and as the stave and head supports are moved rearward and away from the barrel the releasing-pins $d''$ are actuated outwardly by the springs $j^7$, so that their ends project beyond the surface of the head-supporting face-plates, and the shoulders $g^7$ engage with the inner sides of the catch-plates $o'$, where they remain until the heads for the next barrel are placed in position. (See Fig. 19.) While the parts are in this position, the cam-support $p^3$ is in position to bring the cam $h^4$ in its downward movement in contact with the free end of the arm $i^4$, bearing it downwardly and oscillating the sleeve $j^4$ and raising the free end of the arm $q^4$ of the lever $k^4$ and the hoop and head carrying devices, together with the hoops and heads that have in the meantime been placed thereon, to the position shown in Fig. 14, and as the outer end of the lever rises it carries upwardly with it the barrel-ejector $v^6$, and the arms $x^6$ then catch beneath the barrel just completed and carry it upward, and the outer ends of the arms, which reach across the frame, being lower than the back or curved portion thereof, cause the barrel to roll forward and over the machine-frame $a$, and when the parts are in the position shown in Fig. 14 the arms of the ejector will be located above the head and hoop carrying mechanism, and as this position is reached the cam $h^4$ being arranged to allow the parts to remain stationary for a time, while the cam $L^4$ engages with the free end of the arm $m^4$ and oscillates the shaft $n^4$ and arm $o^4$ to draw backwardly upon the rods $t^4$ and $v^4$, which actuates the upper ends of the levers $r^4$ and $u^4$ in opposite directions and carries the heads $x^4$, supported thereby, with a rapid motion against the face-plate $c'$, where they are caught by the projecting spurs $e'$, (see Fig. 15,) and the hoops in the meantime have been passed behind the face-plate by the arms $y^4$, in proximity to the drivers, and the sudden stopping of the outward movement of the levers $r^4$ and $u^4$ as the heads are brought in contact with the face-plates causes the hoops to leave the supporting-arms, in which they are loosely held, and as the heads strike the face-plates they come in contact with the projecting ends of the disengaging-bolts $d''$ and force them with violence inwardly and the shoulders thereon in contact with the disks $o'$, which drives the disks backward and disengages the catches $n'$, and the supports $h'$, then actuated by the springs $m'$, move outwardly and to a position to receive the staves of the next barrel, and the cam $L^4$ has by this time passed the arm $m^4$, and the arm then returns to its original position, actuated by a lever $d^7$ and weight $e^7$, oscillating a shaft $n^4$ and arm $o^4$ in the opposite direction, which brings the upper ends of the levers $k^4$ and $u^4$ toward each other, and the cam $h^4$ has by this time passed the arms $i^4$, so that the long arm $q^4$ of the lever and the hoop and head carrying devices then drop down to their original position, a cushion $f^7$ being provided upon a cross-piece of the frame to receive the jar of the downward movement of the parts, and the devices are again in position to receive the hoops and heads for the next barrel, which are placed in position by the operator while the assembling, clamping, and driving operations are being performed, and while the cams are thus operating the hoop and head carrying devices the wrist $q^3$ is moving the downward portion of its revolution, and as the full revolution is completed after the wrist has started on its backward movement the rock-bars are again oscillated forward to a sufficient distance to propel the heads, clamping-arms, ring-sections, face-plates, and shafts $t$ and $w$ toward each other and to their original position, the sleeves $y'$ sliding forward in the boxes $z'$ until the collars $f^3$ engage with the outer side of the boxes $z'$.

Upon a cross-piece $n^7$ and frame $a$ is secured a downwardly-projecting guide and stop-piece $o^7$, (shown in detail in Fig. 16,) and is provided with the central vertical opening or slot $p^7$, the outer portion of the slot being wider than the inner end thereof, so that as the arm $q^4$ of the lever $k^4$ is raised to lift the heads and hoops into position a guide-piece $q^4$ on the lever comes within the slot $p^7$ and is guided thereby to a central position beneath the clamping and assembling devices, and the heads carried thereon will by this means be placed centrally on the face-plates and the hoops will pass freely over the face-plates to their position in front of the drivers.

During the revolution of the shaft $q^4$ for operating the assembling devices the countershaft $m^6$ is also revolved through the gear-wheels $n^6$ and $o^6$, and this, through the chain $k^6$, imparts a forward movement to the chains $q^6$ for bringing toward the feeding devices the staves required for the next barrel, so that the chains will remain at rest for the interval of the time during which the clamping, hoop-driving, and barrel-ejecting operations are being performed, which allows ample time while the chains remain at rest to place the proper number of staves for a barrel in position on the chains.

During the oscillation of the shaft $t^3$ and rock-bars thereon for effecting the clamping of the staves to the form of a barrel the rod $z^5$, connecting the arm $z^3$ to the arm $y^5$, oscillates the arm $y^5$, and the pawl $d^6$ thereon engages with the notch $b^6$ in the disk $a^6$, turning the disk and shaft $x^5$ about one-fourth of a revolution, where the catch $f^6$ on the arm $e^6$ engages with one of the series of notches $c^6$ on the disk, by which the disk is held against revolution, while the backward oscillation of the loose arm $y^5$ and pawl takes place with the backward oscillation of the rock-arm $z^3$; and the partial revolution of the shaft $x^5$, through the miter-gears $v^5$ and $w^5$, imparts a similar rotation to the shaft $p^5$, which, carrying the upwardly-extending arms $q^5$, oscillates the upper ends of the arm backwardly and slides the heads $k^5$, connected thereto, back upon the ways $i^5$, so that the inwardly-projecting ends of the arms $m^5$, carried by the heads, will be drawn to a position behind the series of staves which are standing edgewise upon the ways, the arms being by the light spring $n^5$ rendered capable of springing outward, so as to pass the ends of the staves.

The portion $d^6$ of the arms $y^5$ is made thin to form a spring which, as the backward oscillation of the arm $y^5$ takes place and the lug portion $h^6$ comes in contact with the inner side of the arm, permits the arm to recede slightly, so that the lug will pass the end of the arm during the extreme rearward movement of the stave assembling and bending devices, and at the end of the movement thereof the end of the arm $y^5$ drops in front of the lug, so that on the short movement forward of the rock-arms to bring the assembling devices in position to receive the staves the lug $h^6$ will engage with the end of the arm $y^5$ (see Fig. 7) and move the arm $e^6$ to disengage the catch $f^6$ from the notch $c^6$, and the parts are then free to be operated in the opposite direction by means of the weight $w^5$, and the weight, acting upon the arm $t^5$, then oscillates the shaft $p^5$ and arms $q^5$ and propels the heads $k^5$ and arms $m^5$ inwardly, thereby pushing the series of staves which are then before the arms into position, so that as the assembling devices revolve the staves are taken from the series one by one, the weight $w^5$ operating to push up the remaining staves as each succeeding stave is taken off by the ribs $j'$.

It will be understood that as the staves are caught by the assembling devices each stave is supported and carried around independently from the remaining staves of the series, the supports $h'$ holding the staves by their ends on the inner sides, while the ring-sections $q''$ engage with the outer sides of the ends as the staves are carried around, so that the middle or wider portions of the staves need not necessarily touch each other until the compression-heads move inward to bend the staves in position, and then the staves move in radial lines inward until the adjacent edges of their middle or wider portions touch and sustain each other in a cylindrical form, and the end portions are then bent inward upon the heads, which places the barrels in proper form to receive the hoops.

By arranging the stave-supports so that they are collapsed or moved inwardly as the staves are bent, and so that they are retained by the catches in a circle of greatly less diameter than the hoops, a free entrance for the hoops is provided, which permits hoops of varying dimensions and of forms that are not entirely circular to be used with perfect success, as should either of the hoops vary from a perfect circle as it is forced forward by the drivers it comes in contact with the inclined faces $k'$ of the stave-supports and is thereby sprung to a circular form and guided over the ends of the staves, and as the hoop-carrying arms $y^4$ are formed of thin and flexible material they easily spring so as to pass the supports after they have been released by the pins $d''$ and expanded to the proper position for receiving the staves, the spring-arms being so arranged around the supporting-disks that as the supports move outwardly the arms will be between the supports and so be free for their retreating movement.

While I have described the pieces $z''$, the heads $b^3$, and springs $e^3$ for oscillating the bending-ring sections and their supports in both directions to permit the ring-sections to move away from the barrel and pass over the drive-hoops, well-known equivalent devices, as cam-grooves suitably formed, may be used with equal success, and other forms of devices than the lever $k^4$ may be substituted as a means of carrying and moving the twin arms, as the arms may as easily be provided with a reciprocating movement and be located to move inward from above or from the side, if more convenient, and other devices of the same general nature may be used for reciprocating and revolving the assembling devices and the stave-bending and hoop-driving devices, so that while the detailed construction of the various elements in the machine seen from the description herein to be necessary for the operation of the machine it is evident that other forms of mechanism may be substituted for many of the elements, and I wish it understood, therefore, that I do not limit my invention entirely to the precise mechanism in all its details as herein described, for effecting the several movements of the devices which perform the consecutive operations.

The compressible stave-supports may be arranged to carry two, or even three, staves, if preferred, and the operation of the various parts will be the same; and the material used may also be varied, for while the machine is described as adapted to staves of a perfectly flat surface, as shown in Fig. 9, other staves formed with a cylindrical saw, with transverse concavo-convex surfaces (shown in Fig. 10) may be used as well, as can also the form of staves shown in Fig. 11, having the concavo-convex form transversely and provided with the required longitudinal bend which forms the bilge of the barrel, as when the staves of this form are received by the supports they are retained in the same position as the straight staves, the supports being collapsed and the staves moved inwardly by the bending-rings in the same manner as hereinbefore described, so that when the ends of the staves engage with the heads the adjacent edges of the staves will rest against each other from end to end with the same effect as if they were bent by the machine. I have also described the mechanism as arranged for placing two hoops only on each end of a barrel; but by arranging the arm $y^4$ to retain three or four hoops each they can be at the same time placed in the machine before the drivers, which will then force the extra hoops on the barrel in advance of the hoops herein indicated.

It will be noticed that while one barrel is being formed and finished by the mechanism one operator is required to place the staves upon the endless carriers in position between the projecting fingers, and as the required number of spaces are provided between the long fingers to contain the requisite number of staves to form a barrel no attention need be given to counting the staves, as each consecutive series of staves is separated from the succeeding series by being pushed forward by the long fingers and fed into the assembling devices by the projecting arms, the movement of the endless carriers being timed so that while one series of staves are being fed into the assembling devices another series is being deposited on the ways, and while the assembling and hoop-driving operations are going on and while the hoop and head placing devices are at rest a second workman has ample time to place the heads and hoops for the next barrel in position upon the head-supports and hoop-carrying arms, so that the several operations required to form and finish are consecutively performed with but two operatives with great speed and uniformity.

It is evident that barrels or kegs of a superior quality can be manufactured by this machine, as all of the several operations, when the parts and devices are properly adjusted, will be uniform, and, the staves, heads, and hoops being of a uniform size and dimension, perfect and uniform work is obtained.

What I claim as my invention, and desire to secure by Letters Patent, is—

1. In a barrel-machine, the combination, with the stave-assembling devices, of the endless carriers provided with a series of outwardly-projecting teeth and having spaces between the teeth for receiving and carrying the staves, with their edges resting on the carriers, substantially as set forth.

2. The combination, in a barrel machine, of the stave-assembling devices with the endless carriers provided with outwardly-projecting teeth, with a series of spaces between the teeth for receiving and supporting the staves upon their edges and corresponding in number to the number of staves required for a barrel and having the last tooth of each series projecting beyond the remaining teeth of the series, whereby each series of staves is separated from the next succeeding series, substantially as and for the purpose set forth.

3. The combination, in a barrel-forming machine, of the rotating devices for placing the staves in a cylindrical form, and devices for feeding the staves one by one to the rotating devices, of the endless chains for carrying the staves in series to the feeding devices, and with each chain provided with a series of outwardly-projecting teeth and having spaces between the teeth for receiving and holding the staves with their edges resting upon the said chains, and having the last tooth of the series projecting beyond the remaining teeth thereof, and mechanism for imparting an intermittent motion to the chains, substantially as set forth.

4. In a barrel-machine, the combination, with devices for assembling a series of staves for a barrel into a cylindrical form, and feedways for sustaining the said series with the inner sides of the staves presented to the assembling devices, of the feeding-arms having their rear ends pivotally supported on the said feedways and with their forward free ends against the outermost stave of the series and capable of oscillating on their pivots to pass behind the next series, the springs for retaining the free ends of the arms in position behind the staves, and mechanism for actuating the arms forwardly for pushing the series toward the assembling devices and for retracting the arms for the next series of staves, substantially as set forth.

5. In a barrel-machine, the combination, with the devices for assembling a series of staves into the form of a barrel, and guideways for sustaining the said series of staves upon their edges, of the sliding heads supported upon said guideways, the feeding-arms pivoted by their rear ends to the said heads and with their forwardly-projecting ends against the outermost stave of the said series, the springs for actuating the free ends of the arms toward each other, and devices for actuating the arm-carrying heads inwardly as each stave is removed from the series, and devices for moving the heads outwardly to bring the said arms behind the next series of staves, substantially as described.

6. In a barrel-machine, the combination, with the assembling devices for placing a series of staves into a cylindrical form, and devices for bending the said staves into the form of a barrel, and ways for supporting on their edges a series of staves to be fed into the said assembling devices, of the sliding heads carrying the pivoted arms with their ends projecting forward and against the outer stave of the said series and provided with springs for actuating the free ends of the arms toward each other, a weight for moving the said heads and arms inwardly as each stave of the series is removed, and mechanism for bending the assembled staves, substantially as set forth.

7. The combination, in a barrel-machine, of the stave assembling and supporting devices, the bending-rings formed in sections and provided with conical inner faces, the series of parallel arms for supporting the said ring-sections, and mechanism for imparting a to-and-fro motion to the arms and ring-sections, and devices, as described, for retaining the rings in a closed position on the first portion of their forward movement and for expanding the sections radially after the staves are bent during the latter portion of the forward movement to release the barrel, substantially as set forth.

8. In a barrel-machine, the combination of the sectional clamping and bending rings provided with a conical or beveled inner surface, and mechanism for operating the rings, as described, with the series of stave-supports arranged in a circular form to receive and support the staves by their ends and capable of moving inwardly when the stave-bending operation is performed, substantially as set forth.

9. In a barrel-machine, the combination of the bending-rings and hoop-drivers and their operating mechanism, as described, with a series of stave-supports arranged in a circular form to receive and support the staves by their ends and capable of collapsing or moving inwardly as the staves are bent, and catches for engaging with and retaining the supports in a collapsed position, substantially as set forth.

10. In a barrel-machine, the combination of the bending-rings, the hoop-drivers, the hoop-placing devices, and mechanism for operating the same, as described, with a series of compressible stave-supports arranged in a circular form to retain the staves by their ends and capable of moving inwardly as the staves are bent, and the catches engaging with and retaining the supports in a collapsed position to allow the hoops to be passed over the support to the drivers, substantially as set forth.

11. The combination, in a barrel-machine, of the stave-bending rings, the hoop-drivers, the head and hoop placing devices, and mechanism for operating the same, as described, the head-supporting plates mounted on the adjacent ends of their operating-shafts and carrying a series of compressible stave-supports provided with rearwardly-projecting catches, with the circular disks mounted on the said shafts in rear of the plates and provided on their front sides with catch-rings to engage with the supports when compressed by bending the staves, and devices for actuating the disks toward the catches, substantially as set forth.

12. The combination, in a barrel-machine, of the stave-bending rings, the hoop-drivers, the head and hoop placing devices and their operating mechanism, as described, the head-supporting face-plates mounted on the adjacent ends of their operating-shafts, a series of compressible stave-supports provided with rearwardly-projecting catches, the disks mounted on the said shafts and having a projecting rim engaging with the said catches when the supports are compressed inwardly, and the releasing-pins passed through the face-plates and with their inner portions engaging with the said disks for releasing the catches when the heads are placed in the face-plates, substantially as set forth.

13. The combination, in a barrel-machine, of the bending-ring sections and their operating mechanism, the face-plates supported on the ends of their operating-shafts and carrying a series of stave-supports capable of moving inwardly when the staves are bent, the retaining-disks mounted on the shafts and engaging with the supports at the end of their inward movement, the releasing-pins passed through the face-plates and disks and provided on their inner ends with a shoulder engaging with the disks when the outer end is projected from the face-plate, and a spring for actuating the pins outwardly, substantially as set forth.

14. The combination, in a barrel-machine, of the bending-ring sections and their operating mechanism, the face-plates mounted on the ends of their operating-shafts and carrying a series of stave-supports capable of moving inwardly when the staves are bent, the remaining disks mounted on the shafts and engaging with the supports at the end of their inward movement, the releasing-pins passed through the face-plates and disks and having their inner ends projecting beyond the disks and provided with a shoulder for engaging with the disks, and a reciprocating hoop-driver provided with a forwardly-projecting portion engaging with and lifting the projecting ends of the releasing-pins, substantially as set forth.

15. The combination, in a barrel-machine, with stave-assembling devices and compressible stave-supports, of a series of arms arranged around a common center and substantially parallel with each other and pivotally secured by one end to a sliding head and carrying on their opposite ends sections of a bending-ring, and mechanism, substantially as described, for moving the arms forward in the direction of their length to bend the staves and for moving the free ends of the arms outwardly and for retreating the arms to release the barrel from the ring, substantially as set forth.

16. In a barrel-machine, the combination, with the face-plates for carrying the heads, and the compressible stave-supports for assembling and retaining the staves around the heads, of the bending-ring sections having a conical inner surface presented to the ends of the staves, a head having a series of projecting arms pivoted thereto by one end and with their opposite ends secured to and supporting the said bending-ring section, and devices for imparting a reciprocating motion to the head and arms, whereby the said ring-sections are forced over the ends of the staves, substantially as set forth.

17. The combination, in a barrel-machine, of the supporting-frame carrying the shafts $t$ and $w$, the face-plates secured to the adjacent ends of the said shafts and provided on their inner sides with devices for holding the barrel-heads thereon and having on their outer or opposite sides a series of radial grooves, a series of radial arms in the said grooves and having on their outer ends a series of stave-supports provided on their outer front surfaces with inclined faces having projecting ribs to receive and engage with the beveled ends of the staves, a series of springs for actuating the said supports outwardly, the bending-ring sections having conical or inclined inner surfaces and reaching over the ends of the staves, and devices for imparting a revolution to the said shafts, face-plates, and stave-supports, substantially as set forth.

18. In a barrel-machine, the combination of the machine-frame carrying the shafts $t$ and $w$, with the face-plates rigidly mounted on the adjacent ends of the said shafts and having on their outer faces devices for securing and supporting the barrel-heads thereon, and a series of spring-actuated supports surrounding the peripheries of the said face-plates and provided with inclined outer surfaces to receive and carry each stave separately and with projecting ribs between the adjacent edges of the staves, the bending-rings surrounding the said series of supports and with their inner edges reaching over the ends of the staves, and mechanism for intermittently revolving the said shafts, face-plates, and supports, substantially as set forth.

19. In a barrel-machine, the combination of the shafts $t$ and $w$, mounted on the frame, the face-plates secured to the adjacent ends of the shafts, and radially-movable stave-supports around the peripheries of the disks, and the series of bending-arms carrying on their outer free ends the bending-ring sections provided with outwardly-beveled inner faces and pivoted by their rear ends to carrying-heads loosely mounted on the said shafts, the outer hoop-drivers $k''$, secured by their outer rims to the inner sides of the said carrying-heads and with their inner rims in proximity to the said bending-sections, and devices, substantially as described, for actuating the said carrying-heads, hoop-drivers, and bending-arms forwardly, substantially as set forth.

20. In a barrel-machine, the combination of the shafts carrying on their adjacent ends the face-plates for retaining the heads in position, the series of compressible supports for carrying the staves around the face-plates, with the sleeves $a''$ over the said shafts $t$ and $w$, the forwardly-projecting hoop-drivers $e''$, secured to the inner ends of the sleeves, the heads $h''$, having outwardly-projecting central hub portions mounted on the said sleeves $a''$, and the outer hoop-drivers $k''$, secured to and projecting forwardly from the peripheral portions of the heads, the series of arms pivotally secured by one end to the said heads and carrying bending-ring sections, and the stationary rings surrounding the outer free ends of the said series of arms for retaining the arms in position for the purpose set forth, and mechanism for moving the said heads to and fro, substantially as set forth.

21. In a barrel-machine, the combination, with the shafts $t$ and $w$, supported by the frame and carrying on their adjacent ends head-supporting plates and compressible stave-assembling devices, as described, and the heads $h''$, mounted on the said shafts and carrying hoop-drivers $e''$, of the series of arms $p''$, pivoted by one end to the peripheries of the said heads and carrying on the inner sides of their outer free ends the bending-ring sections $q''$ and having on their outer sides the ribs or teeth $s''$, and the rings $a'$, surrounding the free ends of the said series of arms and rigidly secured to the frame and provided on their inner sides with the projecting transverse ribs $w''$, coinciding with the ribs $s''$, substantially as and for the purpose set forth.

22. In a barrel-machine, the combination, with the shafts $t$ and $w$, supported by the frame and carrying on their adjacent inner ends mechanism for assembling a series of staves into the form of a barrel, as described, the heads $h''$, mounted on the said shafts and carrying the inwardly-projecting hoop-drivers $e''$, and the series of arms $p''$, pivoted by their outer ends to the said heads and extending inwardly over the hoop-drivers and provided on the inner sides of their projecting free ends with the bending-ring sections $q''$ and with the longitudinal ribs $s''$ on their outer sides, and mechanism for moving the heads and arms to and fro, and springs for actuating the free ends of the arms outwardly, of the compression-rings $a'$, surrounding the free ends of the said series of arms and provided on their inner sides with the transverse ribs $w''$, having their outer surfaces resting upon the outer surfaces of the ribs $s''$ during the bending operation, as described, and devices for oscillating the arms in one direction when near the forward end of their to-and-fro movement and in the opposite direction when near the opposite or rear end of their movement, substantially as set forth.

23. In a barrel-machine, the combination of mechanism for assembling a series of staves into a barrel, the heads $h''$, carrying a series of forwardly-extending bending-arms having on the inner sides of their forwardly-projecting ends the bending-ring sections $q''$, and the ribs $s''$, projecting from their outer sides and provided on their rear sides with the projecting heads $b^3$, and devices for imparting a forward-and-backward movement to the arms, the compression-rings $a'$, surrounding the free ends of the series of arms and rigidly secured to the frame and provided on their inner sides with the inwardly-projecting ribs $w''$, and the outwardly-projecting pieces $z''$, secured to the rings and provided with the beveled faces $a^3$, engaging with the said heads $b^3$ as the arms are moved forwardly, and devices, as the springs $e^3$, for oscillating the said arms in the opposite direction at the end of their backward movement, substantially as set forth.

24. In a barrel-machine, the combination of the devices for assembling and bending the staves into the form of a barrel with the quarter-hoop drivers $k''$, provided on their front edges and adjacent to the ends of the staves with driving-faces $l''$ and carried by heads $h''$, secured to their outer portions, the cross-heads $t'$, with their ends supported by the machine-frame and having their middle portions connected to the said heads $h''$, the adjusting-screws $n''$, passed through and projecting on the inner sides of the heads $h''$, with the sleeves $a''$ passed through the said heads $h''$ and provided on their outer ends with flanges $b''$, the chine-hoop drivers $e''$ within the hoop-driver $k''$ and secured to the inner end of the said sleeve, the springs $m''$ between the said drivers $h''$ and $e''$, and mechanism for imparting a reciprocating motion to the said cross-heads and hoop-drivers, substantially as and for the purpose set forth.

25. In a barrel-machine, the combination, with the machine-frame, the shafts $t$ and $w$, supported thereby and carrying on their adjacent ends mechanism for assembling staves into a barrel, the sleeves mounted on the said shafts and carrying stave-bending devices and hoop-drivers, and devices for imparting a to-and-fro movement to the said sleeves, of the collars $x'$, rigidly secured to the said shafts at the outer ends of the said sleeves, the sleeves $y'$, surrounding the shafts $t$ and $w$ outside of the collars $x'$, the collars $f^3$ upon the shafts at the outer end of the sleeves, the boxes $z'$, supporting the sleeves and rigidly secured to the frame, and the springs $i^3$ around the sleeves between the flanges $h^3$ and the said boxes, substantially as and for the purpose set forth.

26. In a barrel-machine, the combination, with the stave-assembling devices and the hoop-drivers, of the movable arms provided with devices for carrying the hoops, mechanism for moving the arms to bring the hoops in front of the drivers, and mechanism for moving the arms away from each other to release the hoops in front of the drivers, substantially as set forth.

27. In a barrel-machine, the combination, with the stave assembling and bending devices, and the hoop-drivers, and means for operating the same as described, of the twin arms pivoted by one end to a movable support and provided on their free ends with devices for loosely retaining the hoops, mechanism for moving the arms and their supports to bring the hoops in front of the drivers, and mechanism for actuating the free ends of the arms away from each other to leave the hoops before the drivers and for retracting the arms out of the way of the incoming staves, substantially as set forth.

28. In a barrel-machine, the combination, with the stave-assembling devices and the face-plates provided with devices for retaining the barrel-heads thereon, substantially as described, of a supporting-arm pivotally secured to the frame-work and with its free end extending beneath the face-plates and having pivoted thereto by their lower ends the upwardly-extending twin arms, with the inner sides of their upper free ends in proximity to each other and provided on their outer opposite sides with devices for receiving and loosely retaining the barrel-heads thereon, and mechanism for raising the free end of the said supporting-arm upwardly and for oscillating the head-supporting ends of the said twin arms in opposite directions and away from each other, substantially as set forth.

29. In a barrel-machine, the combination of the supporting-frame, face-plates for receiving and retaining the heads in position to receive the staves, devices for assembling and bending the staves into the form of a barrel around the heads, hoop-driving devices, and their operating mechanism, with devices for placing the heads in position on the said face-plates, consisting, essentially, of a lever pivotally supported on the machine-frame and with its free end extending beneath the said face-plates, two upwardly-extending levers pivoted by their lower ends at different points to the free end portion of the supporting-lever and inclined to bring their upper ends in proximity to each other, and provided on the outer sides of their upper ends with devices for receiving and loosely holding the barrel heads and hoops thereon, a cam for raising the free end of the supporting-lever, together with the twin levers, upwardly and for retaining the parts in position with the centers of the heads in coincidence with the centers of the face-plates, and a cam for oscillating the head-carrying arms of the twin levers in opposite directions and away from each other, substantially as set forth.

30. The combination, in a barrel-machine, of the frame carrying stave assembing and bending devices, the barrel-head-supporting plates and hoop-drivers, and mechanism for operating the same, as described, with the shaft or sleeve $j^4$, mounted on the frame and carrying a lever $k^4$, having an arm $q^4$, extending beneath the said barrel-head-supporting plates, the upwardly-projecting twin levers $r^4$ and $s^4$, pivoted by their lower ends to the said arm $q^4$ and carrying on their upper end devices for receiving and retaining the heads and hoops for a barrel, an arm $i^4$, extending from the said sleeve $j^4$, a cam $h^4$, engaging with the arm $i^4$ for oscillating the said shaft $j^4$ to elevate the free end of the arm $q^4$, and twin levers, and devices for moving the free ends of the said twin levers to and from each other while in an elevated position, for the purpose set forth, substantially as described.

31. In a barrel-machine, the combination, with the frame, the shaft $o^3$, mounted on the frame and carrying cams $h^4$ and $L^4$, and devices for rotating the shaft, and the sleeve $j^4$, having on one end a supporting-arm $i^4$, engaging with the cam $h^4$ and carrying on its opposite end a lever $k^4$, having a long arm $q^4$, of the twin levers $r^4$ and $u^4$, pivoted to the said arm $q^4$ by their lower portions and provided on their upper free ends with barrel head and hoop supporting devices, the shaft $n^4$, passed through the sleeve $j^4$ and provided with an arm $m^4$, engaging with the cam $L^4$ and having on its inner portion an arm $o^4$, the rod $t^4$, pivoted to the end of the arm $o^4$ by one end and with its opposite end pivotally secured to the lever $r^4$ below the supporting-arm, the rod $v^4$, with one end pivoted to the arm $o^4$ and with its opposite end pivotally secured to the lever $u^4$ above the supporting-arm, and the barrel-head-supporting face-plates, the hoop-drivers, the stave assembling and bending devices, and mechanism for operating the same, substantially as and for the purpose set forth.

32. The combination, in a barrel-machine, of the head-supporting plates and stave assembling and bending devices, the hoop-drivers, and mechanism for operating the same, of a vertical arm located below and between the said head-supporting plates and passed through a guide-piece secured to the frame and provided on its upper end with projecting downwardly-inclined arms extending beneath the barrel, a lever pivoted to the lower end of the said vertical arm, and devices for automatically operating the lever to lift the said vertical arm for raising the finished barrel above the frame-pieces, substantially as set forth.

33. In a barrel-machine, the combination, with the frame, the head-supporting plates, the compressible stave-supports, the heads carrying the stave-bending-ring sections and hoop-drivers, and the cross-heads across and supported by the frame and secured to the said heads, of the rock-shaft $t^3$, carrying on its opposite ends the rock-bars $s^3$ and $x^3$, the connecting-rods $c^4$ and $f^4$, pivoted to the upper arms of the rock-bars by one end and to the opposite ends of one of the cross-heads by their opposite ends, the connecting-rods $e^4$ and $g^4$, pivoted by one end to the lower arms of the rock-bars and by their opposite ends to the ends of the other cross-head, the connecting-rod $d^4$, pivoted by one end to the lower arm of the rock-bar $s^3$ and with its opposite end mounted on the wrist $q^3$ in the cam-support $p^3$, the shaft $o^3$, and devices for imparting an intermittent rotary motion to the shaft $o^3$, substantially as set forth.

34. In a barrel-machine, the combination of the stave assembling and supporting devices, the barrel-head-supporting plates, and the heads carrying stave-bending and hoop-driving devices with mechanism for imparting a rotary motion to the said stave-assembling devices, consisting of a shaft $e$, having a rotary motion, as described, and carrying the crank $f$, the arm $g$, pivoted by one end to the said crank and provided on its opposite end with the forwardly-projecting pawl $h$, the ratchet-wheel $i$, engaging with the pawl $h$, a shaft $n$, carrying the ratchet $i$ and the miter-gear $o$, the miter-gear $p$, the shaft $q$, carrying the gear $p$ and gear-wheels $r$ and $u$, and the shafts $t$ and $w$, carrying on their inner adjacent ends the said stave-assembling devices and carrying the pinions $s$ and $v$, engaging with the gear-wheels $r$ and $u$, substantially as and for the purpose set forth.

35. In a barrel-machine, the combination, with the shaft $e$, having a rotary motion and carrying a crank $f$, of the arm $g$, pivoted to the crank by one end and provided on its opposite end with a pawl $f$, reaching backwardly, the ratchet-wheel $k$, mounted on a sleeve $l$ and engaging with the pawl, the gear-wheel $m$ upon the sleeve, the shaft $o^3$, carrying the gear-wheel $n^3$ and the cam-support $p^3$, the connecting-rods $d^4$, pivoted to the cam-support, the rock-shaft $t^3$, carrying the rock-arms pivotally connected to the rod $d^4$, the cross-heads $t'$, connected by rods to the said rock-arms, and the heads $h''$, secured to the said cross-heads and carrying stave-bending-ring sections and hoop-drivers, substantially as set forth.

36. In a barrel-machine, the combination, with stave-bending and hoop-driving devices, of a series of stave-supports arranged in a circular form to receive and support the staves by their ends and capable of collapsing or moving inwardly when the staves are bent and provided with the rear beveled or sloping faces $k'$ for guiding the hoops upon the staves, substantially as set forth.

In testimony whereof I affix my signature in presence of two witnesses.

WILLIAM MERRILL.

Witnesses:
 G. P. THOMAS,
 JAS. E. THOMAS.